July 30, 1963 H. T. BREAZEALE ET AL 3,099,300
WHEEL LOCK FOR TIRE CHANGING APPARATUS
Filed July 21, 1960

INVENTORS
HERSHEL T BREAZEALE, FRED MAY & GEORGE MAY
BY
Barnes, Kisselle, Raisch & Choate
ATTORNEYS Patented July 30, 1963

3,099,300
WHEEL LOCK FOR TIRE CHANGING APPARATUS
Hershel T. Breazeale, Dearborn, Fred May, Allen Park, and George May, Dearborn, Mich., assignors, by mesne assignments, to FMC Corporation, San Jose, Calif., a corporation of Delaware
Filed July 21, 1960, Ser. No. 44,340
6 Claims. (Cl. 144—288)

This invention relates to a tire changing apparatus and more particularly to a clamping means for holding the center of a wheel on a tire changing rack.

In a co-pending application, Serial Number 538,211, filed October 3, 1955, in the name of Donald D. Moore, now matured into Patent No. 2,962,065, issued November 29, 1960, there is disclosed a general apparatus for breaking the bead of a tire and clamping the wheel to permit the tire to be removed and replaced. In this application, a replaceable ring for clamping the wheel is provided around a central post, the ring being locked on to a transverse pin projecting to each side of the post and actuated by an air piston. In each case it is necessary manually to place and lock the ring before actuation of the piston and to unlock and remove the ring after release before removal of the wheel.

The present invention relates to an improved device which is adapted for mechanical use where pneumatic clamping is not desired, and it also has the advantage that there are no projecting studs from the pillar for interference with the removal of the wheel from the pillar.

According to the present invention, the outer surface of the pillar is threaded at the top end and a conical clamping collar is applied thereto with a radially shiftable thread-engaging portion which permits the device to be quickly applied down to locking position after which the threads are engaged and the device can be turned slightly to lock.

It is, therefore, an object to provide a locking means which is quickly applied and quickly removed and also one which is adapted to varying size center holes of metal wheels to avoid the necessity of a multiplicity of clamping elements.

Other objects and features of the invention relating to details of construction and operation will be apparent in the following description and claims.

Figure 1:
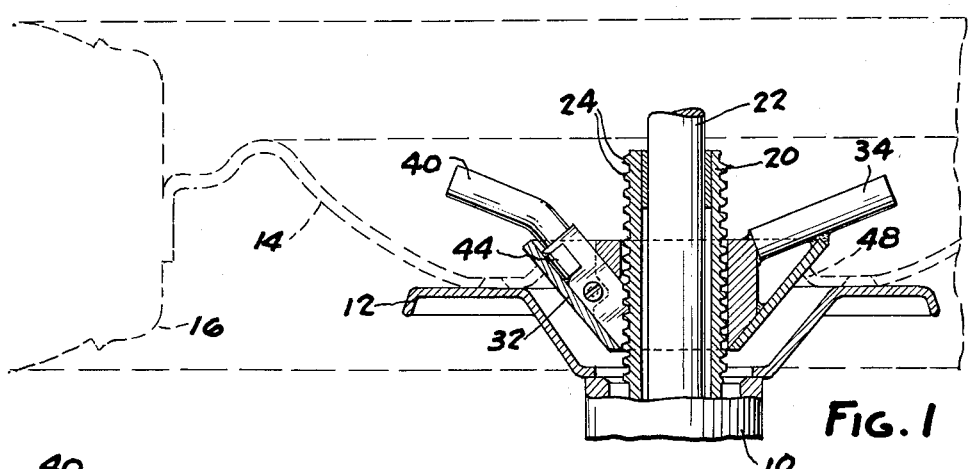

Drawings accompany the disclosure and the various views thereof may be briefly described as:

FIGURE 1, a sectional view showing the elements of the combination.

Figure 2:
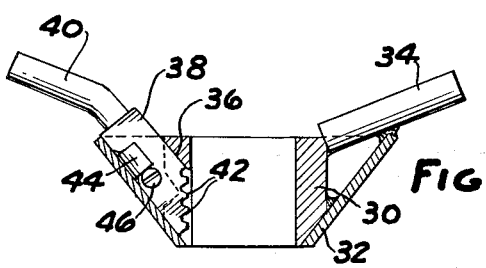

FIGURE 2, a sectional view of the clamping member.

Figure 3:
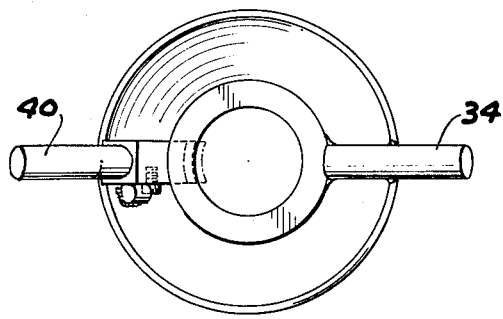

FIGURE 3, a plan view of the clamping member.

Figure 4:
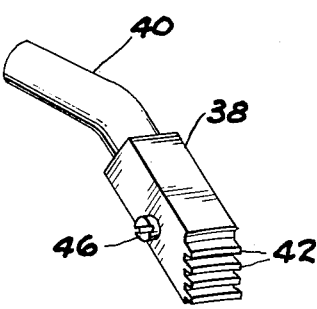

FIGURE 4, a perspective view of a portion of the thread-engaging means of the clamp.

Referring to the drawings:

In FIGURE 1, a central supporting base in the form of a column 10 has an apertured circular dished supporting flange or plate 12 which supports the inner periphery of a wheel disc 14 on which is a rim 16 for a tire mount. Projecting upwardly through and above the column 10 is a secondary column in the form of a threaded hollow tube 20 which may serve as a bushing for a central rod 22 for operation of a tire iron or bead breaking mechanism.

It will be noted that the member 20 is provided with coarse threads 24 in the outer surface extending down below the bottom of the dished plate 12. The clamping collar shown in FIGURES 1 and 2 consists of a cylindrical ring 30 on which is mounted on the outside a conical flange 32 solidly welded to the ring. A stationary handle 34 is also welded to the ring and the flange extending outwardly of these members. Ring 30 is provided with an angled slot 36 extending through the wall of the ring on one side thereof, and in this slot, slidable also on the inner surface of the flange 32, is a locking bar 38 having an extending handle 40 projecting outwardly over the edge of the flange 32. The inner end of the locking bar 38 has spaced segments 42 of male thread members adapted to engage the thread groove of the column 20. A stop 44 on flange 32 serves to limit the outward motion of the bar 38 by reason of the head 46 of a screw in the bar. The angled top surface of the slot is preferably at the same angle as the inner surface of the cone.

It will be seen that in FIGURE 2 that when the bar 38 is fully retracted so that the screw head 46 contacts the stop 44, the thread segments 42 are outside the inner surface of the ring 30. Thus the ring 30 and the composite collar formed of the ring 30 and the flange 32 can be readily slipped on and off of the locking column 20.

The conical configuration of the flange 32 makes it possible for the flange to contact the central openings of varying wheel flanges at different points depending on the size of the opening, making the device adaptable to a large number of different central opening dimensions. It will be noted that the supporting flange 12 has a conical central portion dished to provide clearance for the conical flange 32 as it recesses into the various wheel openings.

As the collar is dropped down on the column 20, it contacts the inner periphery 48 of the tire rim 14 and at the same time that this contact takes place, the handle 40 can be moved inwardly so that the thread segments on the inner end of the bar 38 engage the thread on the column 20.

At this point, the two handles 34 and 40 can be grasped and the collar turned in a clockwise direction and with a very slight rotary motion, the device is locked against the wheel flange and the wheel is centered and ready for a tire operation that is to be performed. The friction of the thread engagement holds the bar 38 in place in the locking phase.

In the release motion, the reverse action takes place. The locking collar is turned in a counterclockwise rotation for perhaps only a quarter of a turn, at which time the handle 40 can be pulled out, the thread segments 42 released from the thread groove of the post, and the entire collar lifted off to permit easy removal of the wheel.

We claim:

1. A wheel clamping device for a tire changing and repair apparatus which comprises a vertical supporting column, a horizontal supporting flange on said column at a proper height for wheel location, said flange having a dished central portion extending downwardly, a threaded post above said column centrally of said flange, a hollow, inverted, truncated, conical shell, slidably concentric with said post to engage a wheel supported on said flange, and radially movable means on said conical shell slidable on the inner wall of said conical shell so as to be inclined to said threaded post, said radially movable means being adapted to threadably engage or disengage said thread on said post whereby said shell may be moved rapidly on to said post into contact with said wheel, said radially movable means may be wedged into threadable engagement with said threaded post and a slight turn will lock the wheel on the supporting flange.

2. A wheel clamping device for tire changing and repair apparatus which comprises a vertical supporting column, a horizontal supporting flange on said column at a proper height for wheel location, a threaded post above said column centrally of said flange, a locking collar slidably concentric with said post, said collar comprising a bushing portion slidable on said threaded post and a wheel contacting portion, said collar having inclined radial guide means which slope downwardly and inwardly toward said threaded post, and radially movable means slidably engaging said inclined radial guide means and adapted to threadably engage or disengage said thread on said post whereby said collar may be moved rapidly on to said post into contact with said wheel, said radially movable means may be wedged between said post and said guide means to threadably engage said threaded post, and a slight turn of said collar will lock the wheel on the supporting flange.

3. A wheel clamping device for a tire changing and repair apparatus which comprises a vertical supporting column, a horizontal supporting flange on said column, a threaded post above said column centrally of said flange, a locking collar slidably concentric with said post, said collar comprising a guide bushing, a wheel contacting portion and radial guide means, said guide bushing being movable on said threaded post, said radial guide means being vertically inclined to said threaded post, and radially movable means slidably engaging said radial guide means and adapted to threadably engage or disengage said threads on said post whereby said collar may be moved rapidly on to said post into contact with said wheel, said radially movable means may be wedged between said post and said guide means to threadably engage said threaded post, and a slight turn of said collar will lock the wheel on the supporting flange.

4. A device as defined in claim 3 in which the guide bushing is provided with a radial opening on one side thereof and the thread-engaging means comprises a block slidable in and out of said opening and having on the inner end spaced thread segments to engage the thread groove of said post.

5. The device as defined in claim 4 wherein said wheel contacting portion comprises an inverted hollow conical shell and said radial opening in said bushing is inclined in the same direction as the surface of said conical shell so that the block may slide on the shell into said bushing opening into and out of engagement with said threads.

6. The device as defined in claim 3 wherein said radial guide means is inclined downwardly and inwardly and opens adjacent said threaded post.

References Cited in the file of this patent

UNITED STATES PATENTS

| | | |
|---|---|---|
| 2,045,778 | Huntley et al. | June 30, 1936 |
| 2,134,500 | Bennett | Oct. 25, 1938 |
| 2,201,982 | Bazarek | May 28, 1940 |
| 2,783,830 | Pozerycki et al. | Mar. 5, 1957 |
| 2,808,860 | Hildebrant | Oct. 8, 1957 |
| 2,850,061 | Twiford | Sept. 2, 1958 |
| 2,895,519 | Coats | July 21, 1959 |
| 2,916,065 | Duquesne | Dec. 8, 1959 |